Nov. 8, 1949    E. V. BUNTING    2,487,096
HITCH MECHANISM
Filed Sept. 20, 1945    6 Sheets-Sheet 1
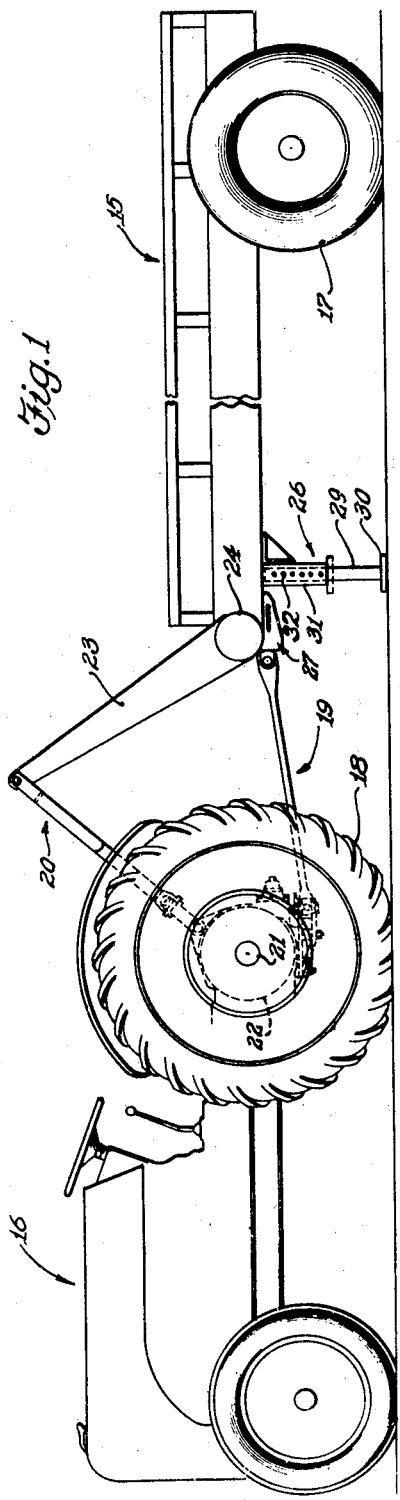
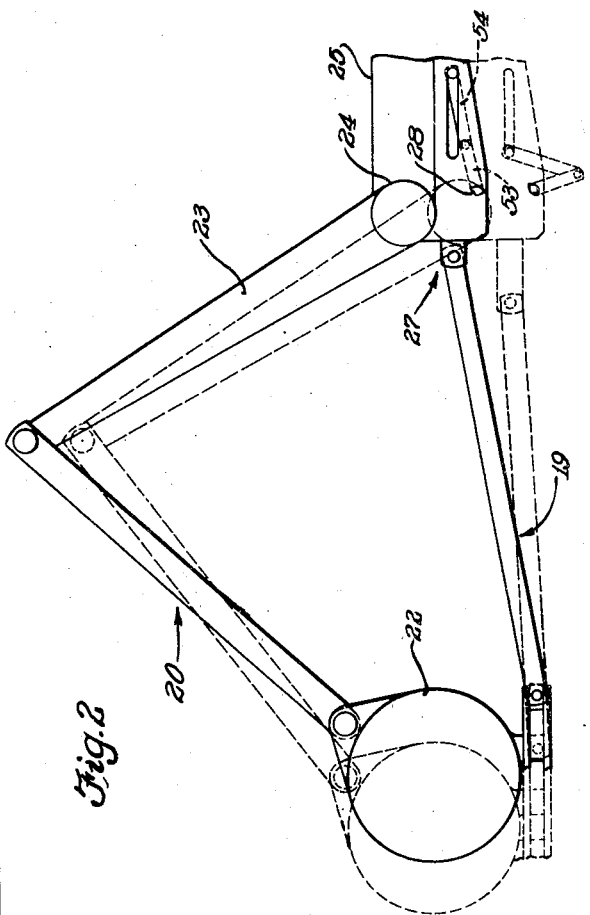
Inventor:
Ernest V. Bunting
By Carlson, Pitzner, Hubbard & Wolfe
att'ys.

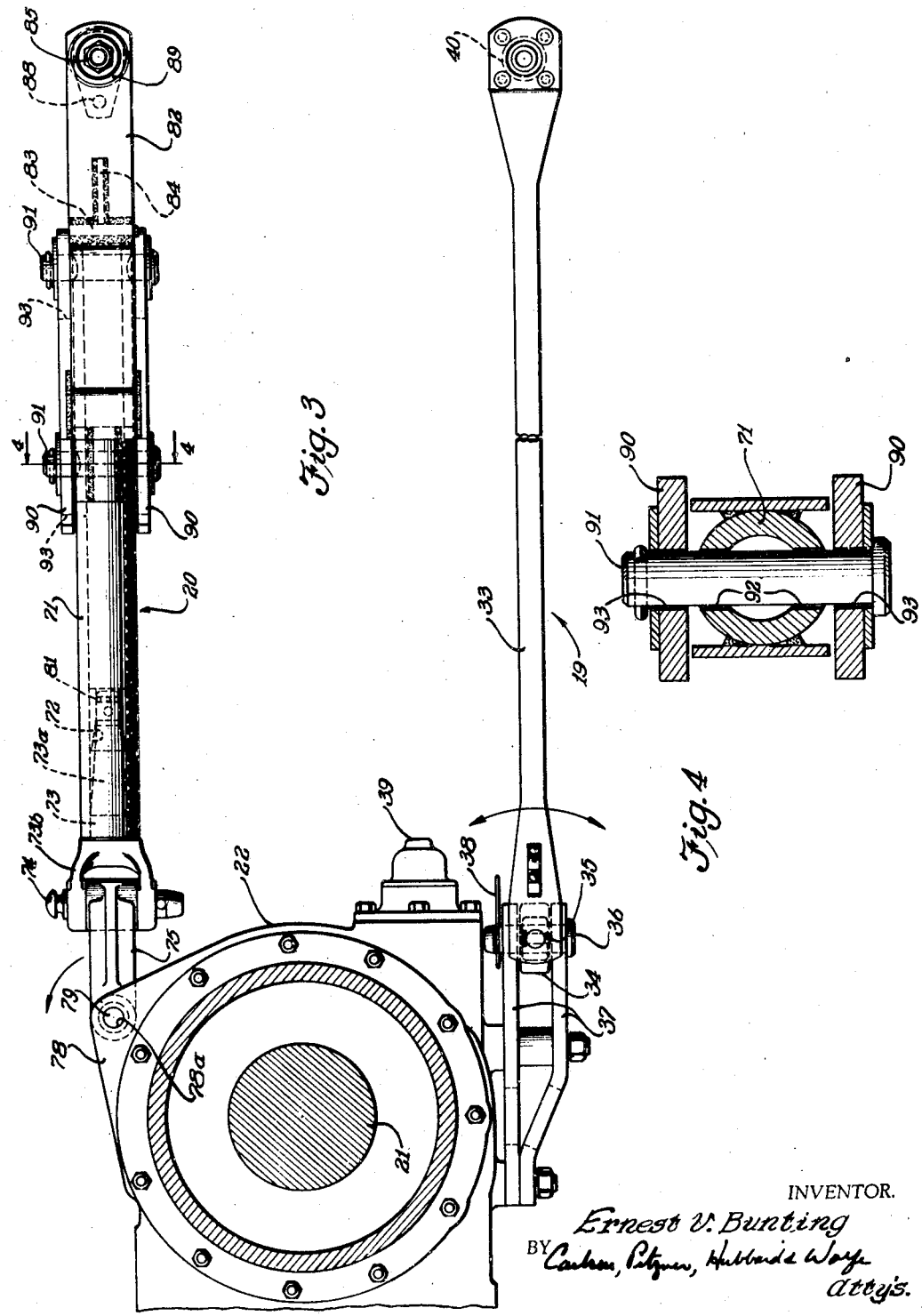

Nov. 8, 1949     E. V. BUNTING     2,487,096
HITCH MECHANISM
Filed Sept. 20, 1945     6 Sheets-Sheet 3
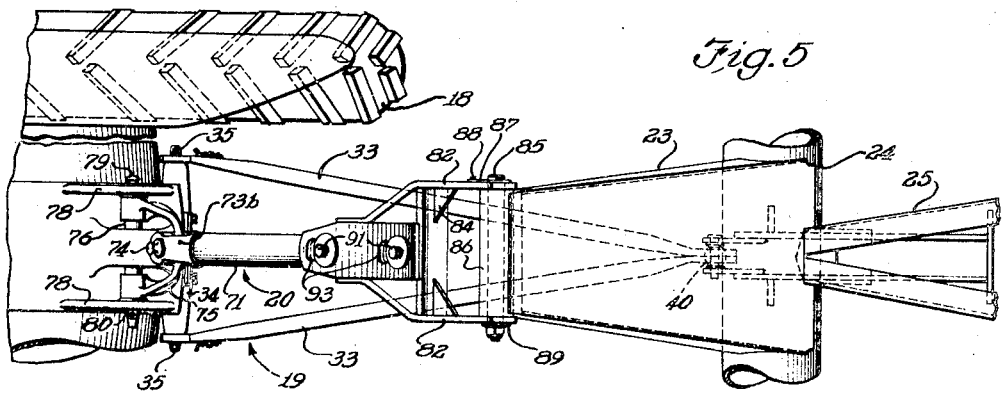
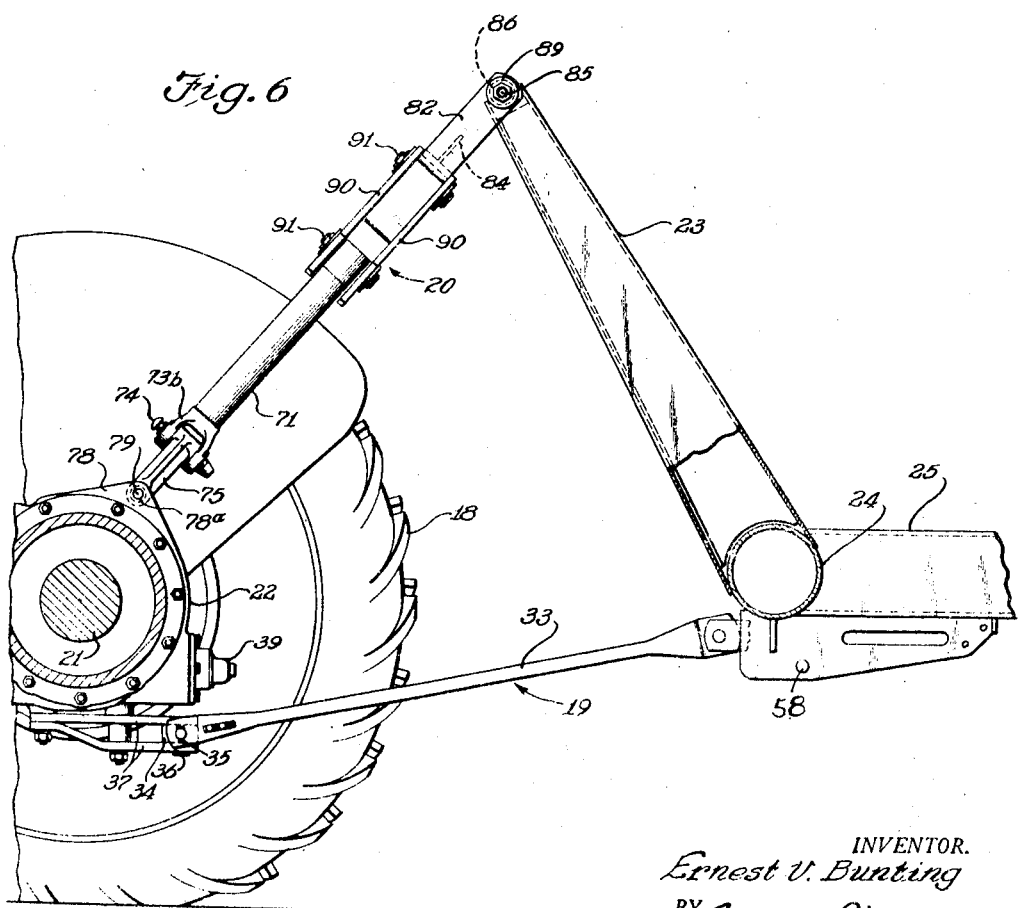
INVENTOR.
Ernest V. Bunting Nov. 8, 1949     E. V. BUNTING     2,487,096
HITCH MECHANISM
Filed Sept. 20, 1945     6 Sheets-Sheet 4
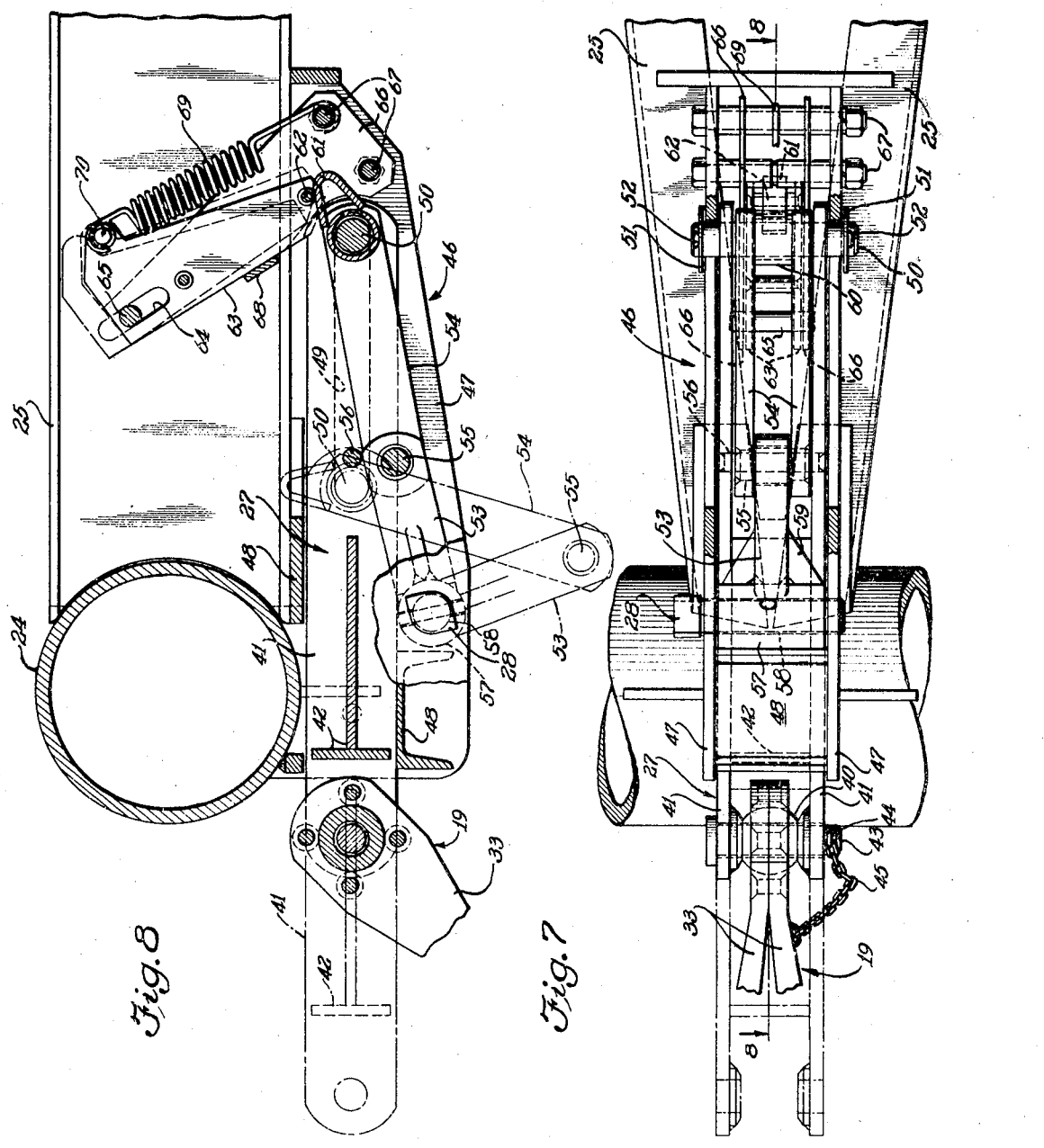
Inventor:
Ernest V. Bunting
By Carlson, Pitzner, Hubbard & Wolfe
Atty's Nov. 8, 1949     E. V. BUNTING     2,487,096
HITCH MECHANISM
Filed Sept. 20, 1945     6 Sheets-Sheet 5
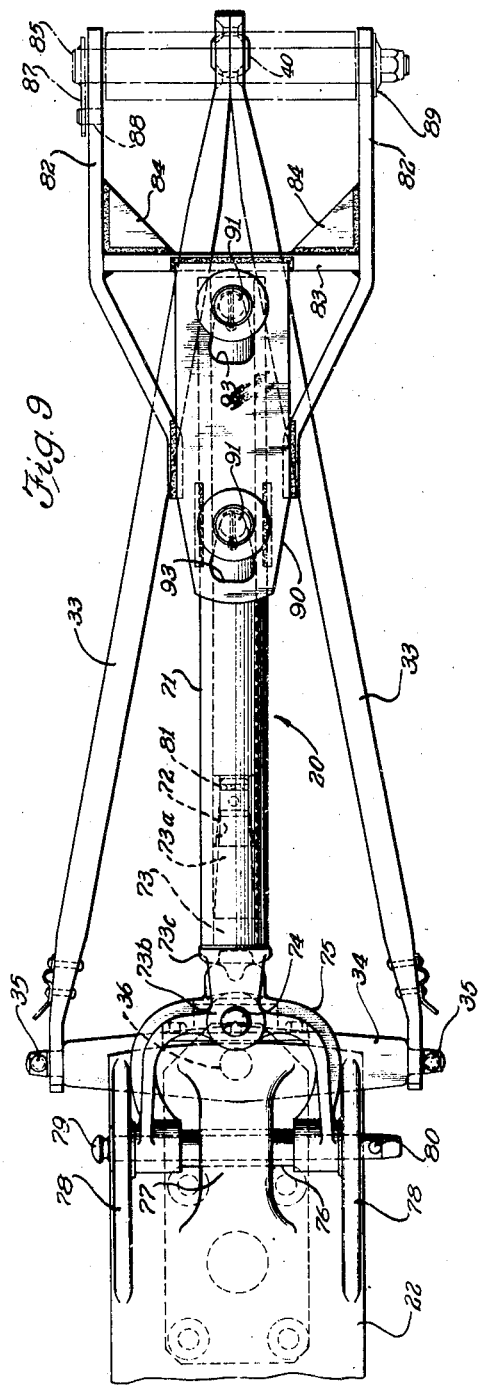
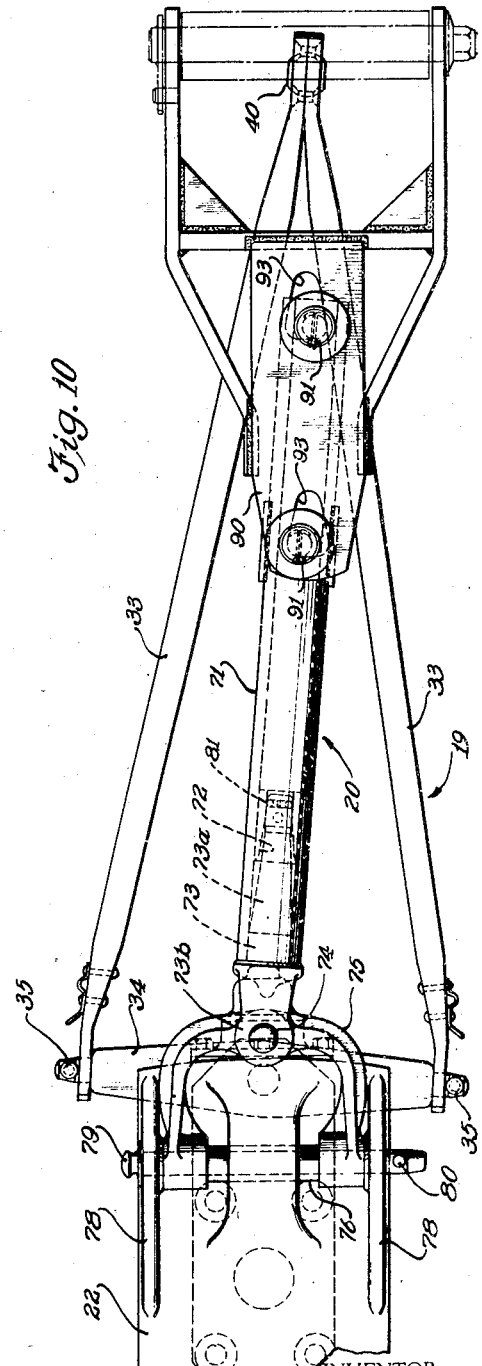
INVENTOR.
Ernest V. Bunting
BY Carlson, Pitzner, Hubbard & Wolfe
Att'ys.

Nov. 8, 1949   E. V. BUNTING   2,487,096
HITCH MECHANISM
Filed Sept. 20, 1945   6 Sheets-Sheet 6
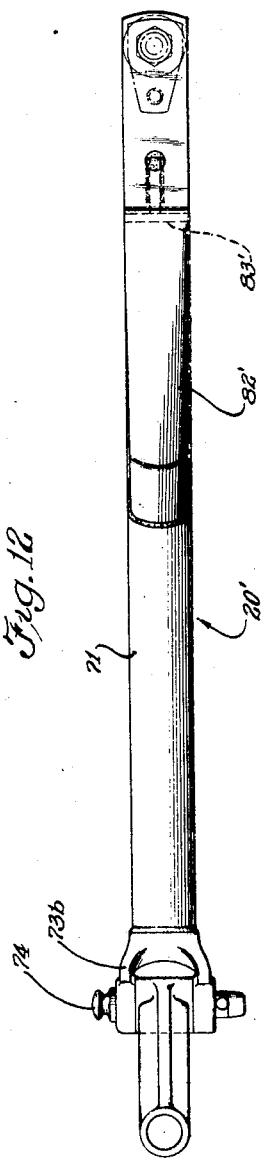
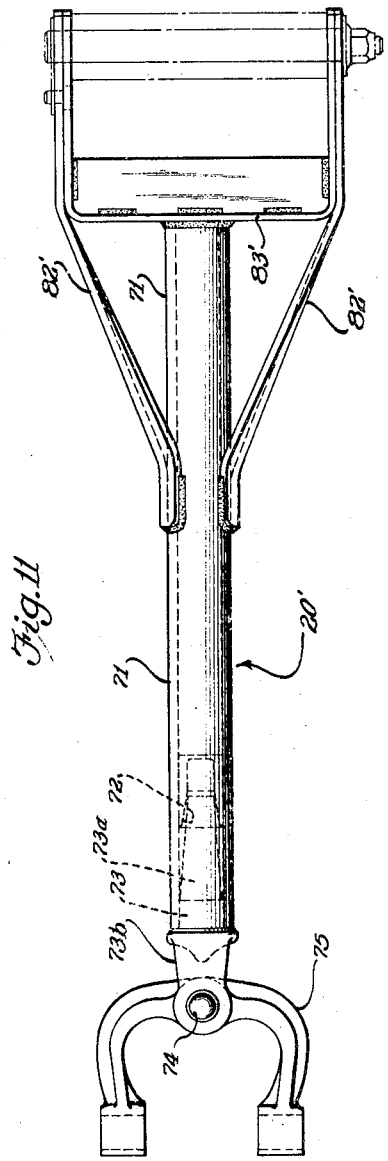
INVENTOR.
Ernest V. Bunting
BY Carlson, Pitzner,
Hubbard & Wolfe
Atty's.

Patented Nov. 8, 1949

2,487,096

UNITED STATES PATENT OFFICE 2,487,096

HITCH MECHANISM

Ernest V. Bunting, Dearborn, Mich., assignor to Harry Ferguson, Inc., Detroit, Mich., a corporation of Delaware Application September 20, 1945, Serial No. 617,651

29 Claims. (Cl. 280—33.4)

1

The present invention pertains to hitches for connecting trailers to tractors and more particularly to hitches of what may be termed "the load transferring type." By a load transferring type hitch, I mean one in which a portion of the trailer weight or load is transferred to the tractor. For that purpose, the trailer is usually of the unbalanced type, being, for example, one with but a single pair of wheels located well to the rear of the center of gravity of the vehicle so that it tends to tip forward.

By proper transfer of the unbalanced weight of the trailer to the tractor, added traction may be afforded for the latter's rear wheels. Complex problems are entailed in such transfer in order to insure against rearing up of the tractor, prevention of interference with steering and various other difficulties that may arise in use on rough terrain and at high speeds. Of those matters, reference may be made to Daniel C. Heitshu application Serial No. 562,445, filed November 8, 1944, now Patent No. 2,441,630, granted May 18, 1948, and assigned to Harry Ferguson, Inc., assignee of the present application, for it is not with such aspects of the problem that the present invention is primarily concerned. On the contrary, the general aim of the present invention is to minimize the difficulties and hazards of coupling and uncoupling such a weight transferring type of hitch.

It should be appreciated that a weight transferring type of hitch is normally under great stress. To uncouple it while under such stress is not only hazardous to the operator and hitch as well, but usually impossible; while to jack up the front end of the trailer for relieving the load on the hitch preparatory to uncoupling is an arduous and time consuming task. Similarly, to couple up the trailer entails placing the hitch under stress and is equally difficult.

Accordingly, one general object of the present invention is to make the relief of stress in a weight transferring type of hitch for uncoupling purposes easy and simple—as simple as flipping a latch to released position. Similarly, it is an object to make coupling up equally simple.

More particularly, it is an object of the invention to provide a hitch including a tension member together with a latch releasable mechanism for effecting what amounts to an elongation of such member preparatory to uncoupling so that as the member elongates the trailer can settle down onto a drop stand or the like, thus freeing the hitch of substantially all of the load theretofore imposed upon it. In coupling up, on the other hand, latching of the tension member in a shortened or non-elongated position in which the hitch is fully stressed is accomplished by a simple backing of the tractor in the course of which the trailer automatically lifts from the stand and after a preliminary coupling of the hitch elements while the latter are still free of stress.

Another important object of the invention is to provide such an unlatching type of arrangement as that indicated for relieving stress in the hitch preparatory to uncoupling but in which the latch itself is free of draft load even when engaged. In other words, even though the latch retains the hitch under stress, the latch itself is not subjected to that stress but merely to the action of a little spring or the like for urging it into latching position.

Another object is to provide a hitch having a stress relieving arrangement operable at will for uncoupling and which may be set for normal draft merely by the thrust of the tractor on the hitch in backing up the tractor toward the trailer.

Still another object of the invention is to provide a new and improved hitch mechanism for connecting to a tractor a trailer of the unbalanced type wherein the hitch includes connecting members so arranged that when the tractor and trailer move relatively together, the forward end of the trailer will be elevated and when the tractor and trailer move relatively apart, the front end of the trailer will be lowered, and means for maintaining a predetermined spaced relation between the tractor and trailer during normal operation, said means being disengageable to permit of relative movement of the tractor and trailer whereby to move the front end of the trailer vertically with respect to means for supporting the front end of the trailer a given distance from the ground.

In a somewhat different aspect it is also an object of the invention to simplify the coupling-up of a multi-link hitch through improvements which afford a wide tolerance of alignment between tractor and trailer during coupling.

Further objects and advantages of the invention will become apparent as the following description proceeds, taken in connection with the accompanying drawings in which:

Figure 1 is a side elevation of a tractor and trailer connected by hitch mechanism embodying the present invention.

Fig. 2 is a more or less schematic stop motion showing of the hitch in Fig. 1, illustrating successive positions in the course of uncoupling, the moved positions of the parts being somewhat exaggerated.

Fig. 3 is an enlarged side elevation of the upper and lower linkages included in the hitch mechanism of Fig. 1 as well as the rear end portion of the tractor to which they are connected, the upper hitch link being shown as swung down into parallelism with the lower link simply to conserve space in the drawing.

Fig. 4 is an enlarged detail sectional view taken substantially along the line 4—4 in Fig. 3.

Figs. 5 and 6 are, respectively, fragmentary plan and side elevational views of the hitch mechanism shown in Fig. 1 but on a somewhat larger scale.

Fig. 7 is an enlarged bottom view of the latch mechanism and associated parts included in the hitch of Fig. 1, the mechanism being shown partially in longitudinal section.

Fig. 8 is a vertical sectional view taken substantially along the line 8—8 in Fig. 7.

Fig. 9 is a plan view of the upper and lower links included in the hitch mechanism of Fig. 1 and also showing a fragmentary portion of the rear end of the tractor.

Fig. 10 is a view similar to Fig. 9 but showing the shifted position of the parts upon misalignment of the same.

Figs. 11 and 12 are plan and side elevations of a modified form of top link adapted to be substituted in the hitch mechanism of Fig. 1.

While the invention is susceptible of various modifications and alternative constructions, I have shown in the drawings and will herein describe in detail certain preferred embodiments, but it is to be understood that I do not thereby intend to limit the invention to the specific forms disclosed, but intend to cover all modifications and alternative constructions falling within the spirit and scope of the invention as expressed in the appended claims.

Referring more particularly to the exemplary embodiment of the invention herein illustrated, the same has been shown as incorporated in a hitch mechanism for connecting a trailer 15 to a tractor 16 (Fig. 1). The tractor itself will be recognized by those skilled in the art as being the familiar lightweight Ford agricultural tractor. The trailer 15, on the other hand, is shown as having a single pair of wheels 17 located well to the rear so that the trailer is heavily overbalanced forwardly. The unbalanced weight of the trailer is applied by the hitch to the pneumatic-tired rear or traction wheels 18 of the tractor.

The hitch shown is of the weight-transferring type and includes a lower tension linkage designated generally as 19, as well as a top compression link 20 through which links the trailer weight is applied to the tractor. Details of such linkage will appear later. For the present, suffice it to say that the lower linkage 19 is universally connected at its opposite ends to trailer and tractor, being connected to the latter at a point below the tractor rear axle 21, whereas the top link 20 is inclined forward and downward with a line of action located to intersect the line of draft at a point lying forward of the rear axle but sufficiently close to such axle to not be displaced during the relative turning movements of the tractor and trailer substantially beyond the lateral limits of the tractor rear wheels. The lower end of the top link is universally connected to the tractor's differential housing 22 while the upper end of such link is pivoted to a mast 23 rigid with the trailer frame, being free to rock vertically at the point of connection with such mast, but restrained against lateral swing at such point. Consequently, all lateral movement of the trailer with reference to the tractor takes place about the pivots at the forward ends of the links 19, 20, such pivots being located on a vertical line passing through the center of the tractor's rear axle or displaced only slightly to the rear of the same.

The mast 23 may, for example, be of the general box-like form or section indicated in Figs. 5 and 6 to afford maximum rigidity. At its lower end, the mast is fixed to a transverse tubular member 24 which is in turn rigid with the framing 25 of the trailer.

Appropriate removable pins, hereinafter identified in detail, are provided in the joints between the tractor and the upper and lower hitch links and removal of these pins serves to effect uncoupling. It will be perceived that the heavily overbalanced trailer 15 places the hitch linkage under heavy stress, the top link being under compression and the lower linkage 19 under tension, wherefore some arrangement must be afforded for relieving the hitch of such stress to permit withdrawal of the pins for uncoupling.

To afford ease of coupling and uncoupling, I have provided a construction such that during uncoupling the user has but to release a latch to transfer a substantial portion of the front end trailer weight to a suitable ground-engaging element, here shown as a drop stand 26 (Fig. 1). And similarly, in coupling on, the operator has only to back up the tractor, connect the links, and then by further backing transfer the weight from the stand to the hitch and thence to the tractor, whereupon the latch automatically snaps closed to retain the parts in such normal operating relation. Of other improvements in reference to the arrangement for taking care of slight misalignment as the tractor is being backed into coupling-up position, etc., more will appear later in connection with the detail of the disclosed mechanism.

The general procedure followed in shifting weight onto and off the drop stand 26 may be best perceived by reference to a diagrammatic showing in Fig. 2. As there indicated, a slide 27 is connected to the rear end of the tension member 19 and constitutes in effect an extension of the same, movable endwise between alternate limit positions. By movement from its rear limit position to its forward limit position, the slide serves to accomplish what amounts to an elongation of the lower or tension member of the hitch linkage. As an incident to such elongation, the angle between the top link 20 and mast 23 flattens out somewhat so that the front end of the trailer is lowered until its weight is applied to the drop stand 26. A latch mechanism, a suitable form of which is hereinafter described, is provided for releasably retaining the slide 27 in its rearward or retracted position for minimum length of the tension member 19. The slide occupies such retracted or latched position during normal operation of the hitch.

To release the latch the operator has only to apply a wrench to a head 28 and turn it, while in coupling up the trailer, thrust of the tractor on the lower linkage 19 incident to backing the tractor shoves the slide 27 rearward for automatic engagement of the latch. The drop stand 26 may take various forms having been indicated simply as a post 29 with a foot 30 and arranged to slide vertically in a tubular housing 31 fixed to the underside of the trailer frame. A pin (not shown) may be passed through registering holes 32 through the housing 31 and post 29 for holding the latter in elevated position when it is out of use or in lowered position when weight is to be transferred to it.

Turning now to somewhat more of the detail of the exemplary hitch, the lower linkage or tension member 19 comprises a generally triangular structure pointing toward the rear and including a pair of forwardly diverging links or side bars 33 (Figs. 5, 9 and 10). At their forward ends the links 33 are joined by a transverse drawbar 34 having suitable projections on its ends which pass through holes in the links 33, the latter being held against accidental removal by linchpins 35. The transverse bar 34 is pivoted on a central pin 36 to swivel laterally about a vertical central axis. This pivot pin 36 passes between vertically spaced arms of a bracket 37 (Fig. 3) bolted to the underside of the differential housing 22, the pivot pin being held against inadvertent displacement by a spring clip 38. The links 33 are thus universally jointed to the rear end of the tractor, being swingable laterally about the pin 36 and vertically about the projecting ends of the bar 34. Since the forward ends of the links 33 are spread apart, they have ample clearance from the rearwardly projecting power take-off shaft 39 protruding from the differential housing.

At their rear ends the links 33 are fixed together and have swiveled between their opposed faces a partial ball or sphere 40 to form a universal joint for connecting the linkage to the slide 27 previously mentioned.

In the illustrated construction the slide 27 (see Figs. 7 and 8) comprises a pair of parallel side bars 41 rigidly joined by cross webbing 42. A removable transverse pin 43, passing through the centrally apertured ball 40 and registering holes in the slide's side bars 41, completes the connection from the tension member 19 to the slide 27, this pin being held against inadvertent displacement by linchpin 44 on a chain 45.

The slide 27 is received for endwise movement in a housing designated generally as 46 (Figs. 7 and 8) secured to the underside of the forward end of the trailer frame 25. The housing 46 comprises a pair of spaced parallel side plates 47 joined by a suitable transverse webbing 48 on which the slide 27 rides. The side plates 47 of the housing 46 are longitudinally slotted as indicated at 49 to receive the projecting ends of a transverse pin 50 carried by the slide 27, such pin being held against endwise displacement by washers and cotter pins 51, 52. Abutment of the pin 50 against the forward ends of the slots 49 positively limits the forward travel of the slide 27, whereas its rearward travel is limited by a length of a toggle linkage next to be described.

Coacting with the slide 27 is a toggle linkage comprising links 53, 54 (Fig. 8) connected by a pivot pin 55. This toggle linkage is arranged to break in opposite directions over dead center, its breaking movement in an upward direction being limited by a fixed abutment or stop pin 56 extending across the slide plates 41, while it is free to break downwardly to the substantially fully collapsed position indicated in dot-dash lines in Fig. 8. When the slide 27 is in its retracted position for normal operation, the toggle linkage is partially collapsed upward (as shown in full lines in Fig. 8) with the toggle linkage pressed upward against the stop 56 where it is, of course, held by the draft load acting through the slide. On the other hand, when the toggle linkage is broken downward across dead center to the fully collapsed position (shown in dot-dash lines in Fig. 8) the slide 27 is fully projected forwardly for the elongation of the lower tension member of the hitch.

In the toggle linkage the link 53 is rigid with a sleeve 57 (Fig. 7) fixed to a pin 58 extending transversely between the housing side plates 47 and having on one end the operating head 28 previously noted. Reenforcing gussets 59 join the link 53 to the sleeve 57. The other toggle link 54 comprises a pair of bars fixed to a sleeve 60 through which the pin 50 passes.

A latch arrangement is provided for urging the toggle linkage 53, 54 from dead center position into abutment with the stop 56 and also for yieldably retaining or holding the toggle linkage in such position. As illustrated (Figs. 7 and 8), such latch mechanism includes a latch nose 61 comprised of a U-shaped strap fixed to the outer end of the link 54. Coacting with this latch member 61 is a keeper in the form of a pin 62 extending transversely between a pair of carrier plates 63. Such carrier plates are longitudinally slotted as indicated at 64 and mounted for limited endwise sliding movement on a pin 65 passing through these slots. The pin 65 joins a pair of supporting plates 66 which are secured to the side plates 47 of the housing 46 by through bolts 67. A transverse strap 68 fixed to the forward edges of the supporting plates 66 is arranged to act as a stop limiting the forward swing of the carrier plates 63 with reference to the stationary supporting plates 66.

A contractile spring 69 serves to urge the keeper 62 against the latch nose 61. For that purpose, the spring 69 is anchored at one end to one of the bolts 67 and at its other end to a pin 70 fixed to the upper rear edge portions of the carrier plates 63. The spring 69, thus located, urges the carrier downward and tends to rock the same to the left (as viewed in Fig. 8).

With the toggle linkage 53, 54 broken over dead center against the stop 56 in the full line position shown in Fig. 8, the slide 27 is held firmly in the retracted position shown. Draft tension applied in a forward direction to the slide, as an incident to normal operation of the hitch, simply tends to urge the toggle linkage more firmly against the stop 56. At such time the keeper 62 is pressed yieldably against the top of the nose 61 by the spring 69, thus keeping the toggle linkage from being jarred out of the position noted. To free the slide 27 for forward movement, the operator need only apply a wrench to the head 28 and give it a twist in a direction to break the toggle linkage downward over dead center. Once the toggle linkage has crossed dead center, the forward pull or tension applied to the slide 27 pulls it forwardly, snapping the toggle linkage downward to the fully collapsed position indicated in dot-dash lines in Fig. 8. In moving to such position, the latch nose 61 swings forward and upward, camming the keeper 62 upward until the latter rides free of the nose.

It will be noted that the head 28 on the operating pin 58 is shaped to present two diametrically opposite, smoothly tapered, projections rather than being of a square or hexagonal shape, such as is more commonly used on operating shafts for the application of a wrench. The purpose of the special shape of the head 28 illustrated is to permit the head to override the wrench once the toggle linkage has passed through dead center. Provision should be made for such overriding since it will be appreciated that the toggle linkage, once it is past dead center, slams into collapsed position with considerable force and consequently the head should be able to override the wrench to avoid injury to the operator.

To restore the slide 27 to its retracted position shown in full lines in Fig. 8, the tractor is backed toward the trailer, applying a rearward thrust to the slide through the lower linkage 19. As the slide retracts, the toggle linkage 53, 54 is straightened out. As it approaches dead center, the keeper 62 rides over the latch nose 61, tending to force it downward so that the toggle linkage is finally broken over dead center in an upward direction against the stop 56, all as part of a simple inward thrust on the slide.

Having observed the details of the lower linkage 19 and its coacting slide, toggle and latch mechanisms, attention may now be given to the top or compression link 20 (see Figs. 3, 5, 9 and 10). The top link 20 and the connecting means therefor are, in the present instance, constructed in a novel manner to afford a maximum degree of tolerance in alignment of the tractor and trailer when coupling up the hitch. In the illustrated construction, the top link 20 includes a tubular member 71 having a tapered socket or sleeve member 72 fixed in its lower end portion and into which is entered a stem 73 having a tapered end portion 73a. The forward end portion 73b of the stem 73 is yoke-shaped, being connected by a vertical pivot pin 74 with a yoke 75 which is pivoted to swing vertically and thus complete a universal joint connection for the forward end of the toggle link. A shoulder at 73c on the stem 73 abuts the lower end of the tubular member 71, limiting entry of the stem into the latter and receiving the thrust of the compression load applied to the top link during use of the hitch.

The yoke 75 is journaled to rock vertically upon a transverse pivot pin 79 retained in place by a linchpin 80. The pin 79 extends through a bushing 76 passing through a central upstanding lug 77 on the differential housing 22. Moreover, the outer end portions of the pin 79 are received by and supported in bores 78a in two laterally spaced integral ears 78 on such housing. It will be noted that a clearance is afforded between the arms of the yoke 75 and the adjacent sides of the central lug 77, and that the bushing 76 projects outward into such clearance spaces. A shackle (not shown) for the hydraulic control may be pivoted on the bushing in such clearance spaces. For an example of such a shackle see part 24 in Fig. 1 of H. G. Ferguson Patent No. 2,118,180.

The mating tubular and stem members 71, 73 of the top link 20 may be releasably fixed together as by a snap ring 81 seated in an annular groove in the inner end portion of the stem 73 and expanded into a coacting annular groove within the socket member 72. However, where the yoke 75 and stem 73 are assembled as a unit not intended for disassembly the snap ring and groove arrangement may be omitted, such parts having been omitted in the modified top link shown in Figs. 11 and 12. Upon the application of a predetermined tension load to the top link as, for example, in the event of breakage of the lower link 19 or failure to connect the same, the top link members 71, 73 are permitted to pull apart endwise by release of the snap ring 81 from the groove in the inner end portion of the socket member 72.

At its upper or rear end, the top link 20 is provided with a laterally spaced pair of straps 82 rigidly joined by transverse member 83 reenforced by gussets 84. A removable pivot pin 85 extends horizontally between the arms 82 through a suitable sleeve 86 presenting an internal bronze bushing and fixed to the upper end of the mast 23 (Fig. 5) thus journaling the top link 20 to swing vertically with reference to the mast although restraining it against lateral swing with respect to the latter. A plate 87 fixed to one end of the pin 85 and having a stud 88 on it entered in a registering hole in the adjacent strap 82 holds the pin against turning relative to the link so that all movement incident to swinging of the top link takes place between the pin 85 and its coacting bearing sleeve. The opposite end of the pin 85 is threaded to receive a nut pressing against a resilient dished washer 89. Pressure through this washer tends to close the straps 82 against the ends of sleeve 86, making the joint sufficiently "sticky" so that the top link will remain projecting out at a desired angle during coupling-up of the hitch.

Provision is made for lateral play of the tubular member 71 when the top link 20 is not under compression, thus affording considerable tolerance in alignment of the tractor and trailer during coupling of the hitch. For that purpose a pair of vertically spaced plates 90 (Figs. 3 and 9) are welded or otherwise rigidly secured to the straps 82 and cross-bar 83 at the upper end of the top link. Between these plates 90 is slidably received the upper end portion of the tubular member 71. Pins 91 pass through suitable transverse bores 92 (see Fig. 4) in the tubular member 71, at longitudinally spaced points in the latter, being snugly received in such bores. The ends of these pins project through suitably shaped apertures 93 in the plates 90, the pins being equipped with washers and cotter pins as shown which retain them in place. The apertures 93 in the plates 90 are generally triangular in shape and when a compression load is applied to the top link 20 the pins 91 are forced into the upper ends of these apertures 93 where they are snugly received, as shown in Fig. 9. In such condition the tubular member 71 cannot swing laterally with reference to the plates 90. On the other hand, when compression load is removed from the top link 20, the tubular member 71 is free to slide downward so that the pins 91 are located in the enlarged lower ends of the apertures 93, thereby permitting a substantial degree of lateral swing of the tubular member 71 with reference to the rigid mast 23 on the trailer (see Fig. 10).

The tapered form of the nose or entry portion of the stem 73 affords a limited degree of tolerance in aligning the tractor and trailer for coupling-up the hitch. If it is desired to rely upon that tolerance alone, the top link structure may be simplified by omitting the pin and plate arrangement 91, 90 heretofore described. A modified form of top link 20' embodying such a simplified arrangement is illustrated in Figs. 11 and 12 and which may be substituted if desired for the top link 20 described above. In the top link 20' the construction is the same as in the top link 20 except that straps 82' and a reenforced U-shaped member 83' corresponding to the cross-bar 83 are welded or otherwise rigidly attached directly to the tubular member 71.

The same reference numerals have been used for the remaining parts which are identical with the corresponding elements of the top link 20, and accordingly repetition of description of the same is unnecessary.

The operation of the disclosed hitch mechanism will in general be clear from the foregoing. By way of brief recapitulation, let it be assumed first of all that the trailer 15 is disconnected from the tractor 16, the overbalanced front end portion of the trailer being rested on the drop stand 26. To connect the tractor to the trailer, the yoke 75 of the lower end portion of the top link 20 is connected to the tractor by inserting the pin 79, whereas the upper end portion of the top link 20 is, we shall assume, attached to the mast 23. The lower linkage 19 being connected to and extending forwardly from the trailer, the tractor 16 is backed toward the trailer 15, and as they approach, the tapered stem portion 73a of the top link 20 is entered into the socket 72. A considerable degree of tolerance in alignment of the top link parts is permitted by the arrangements heretofore detailed. The lower linkage 19 is connected at its forward end to the tractor by inserting a pin 36. The free fore and aft movement of the lower linkage 19, permitted by the unlocked slide at such time, greatly facilitates connection of the lower linkage. The hitch elements are thus coupled-up, but still without any stress being applied, since the unbalanced trailer weight is still borne by the drop stand 26.

After the hitch element have been coupled-up they occupy substantially the relative positions diagrammed in broken lines in Fig. 2. Upon a further backing of the tractor with the trailer wheels 17 blocked (e. g., by the usual trailer brakes), the link 20 moves toward a more nearly vertical position (in effect "jack-knifing" toward the mast), which movement pushes the mast 23 upward to the full line position shown in Fig. 2, thereby raising the front end portion of the trailer. It will be understood, incidentally, that the movement of the parts is somewhat exaggerated in the showing of Fig. 2 so as to clarify the action which takes place. Coincident with the upward thrust on the mast 23, the lower linkage 19 is shoved rearwardly, thereby pushing the slide 27 into its housing 46. As the slide moves inward the toggle linkage 53, 54 is straightened out and finally snapped over dead center against the positive stop 56 by the coacting latch mechanism, all as heretofore detailed. Coupling of the hitch is thus completed and the drop stand 26 relieved of weight so that the driver can push the drop stand up into inoperative or transport position.

Once the connection of the hitch has been completed as described above, the front end of the trailer is supportingly connected to the tractor and the tractor can be used in the usual manner to pull the trailer wherever desired. No matter how great the tension draft load may be that is applied to the lower linkage 19, there is no danger of overloading the latch mechanism. This is for the reason that tension in the lower linkage 19 simply forces the toggle linkage 53, 54 against the positive stop 56.

To disconnect the trailer from the tractor is, again, a simple matter. The drop stand 26 is lowered into ground-engaging position and a wrench applied to the toggle operating head 28, the latter being turned to snap the toggle linkage 53, 54 across dead center away from the stop 56. The tension stress in the lower linkage 19 pulls the slide 27 forward so that the toggle linkage is substantially fully collapsed in a downward direction, the parts moving from the full line position indicated in Fig. 2 toward the broken line position there shown. In the course of such movement there is not only what amounts to an elongation of the lower tension connection of the hitch, but also a flattening of the angle between the top link 20 and mast 23 as the front end of the trailer settles down. Such lowering of the front end of the trailer transfers its weight to the drop stand 26 so that the hitch mechanism itself is relieved of stress. Thereafter selected ones of the connecting pins may be readily removed for completely uncoupling the tractor from the trailer.

I claim as my invention:

1. In a hitch mechanism for attaching to a tractor a trailer having ground-engaging means about which the trailer is overbalanced forwardly, the combination of upper and lower connecting means each attachable respectively to the rear end portion of the tractor and front end portion of the trailer with the upper connecting means under compression and the lower connecting means under tension, said lower connecting means including mechanism for changing the relative spacing between the points of attachment to the tractor and trailer respectively, and a latch for releasably maintaining the spacing at a predetermined minimum value corresponding to normal support of said trailer.

2. The combination with a load transferring type of hitch including linkage having relatively spaced points of attachment thereto variable between fixed limits in the direction of applied stress when the hitch supportingly connects the front end of a forwardly overbalanced trailer to the rear end of a tractor, of means for releasably latching said linkage against movement toward the limit position to which it tends to move under such stress.

3. The combination with a load transferring type of detachable hitch for connecting an unbalanced trailer to a tractor, said hitch including means providing points of attachment which are spaced relative to one another in the direction of load stress, of means manually operable at will for allowing a change in the spacing between said points under the influence of said stress and in the course of which the trailer settles down onto an underlying support or the like and thereby relieve the stress in said hitch preparatory to detaching the same.

4. In a hitch mechanism for attaching to a tractor a forwardly overbalanced trailer with a transfer of the unbalanced trailer load to the tractor, the combination of a connecting means attachable to the tractor and trailer respectively, an element slidably movable with said connecting means, stop means defining two limit positions of sliding movement for said element along a line of movement along which said element is stressed when supportingly connecting the trailer to the tractor and in which two positions the forward end of the trailer is at two respectively different heights from the ground, and means for releasably securing said one element in its limit position in which the front end of the trailer is in the higher of its two elevations, whereby release of said securing means permits said element to move automatically toward its other limit position under the influence of the unbalanced trailer load so that the trailer front end lowers and in lowering may be brought to rest on a suitable ground support to relieve said hitch of stress for ease of detachment.

5. In a hitch mechanism for attaching to a tractor a trailer having ground-engaging means about which the trailer is overbalanced forwardly, the combination of upper and lower connecting means each attachable respectively to tractor and trailer with the upper connecting means under compression and the lower connecting means under tension, and means supporting one of said connecting means for a limited movement with reference to the other connecting means and arranged so that movement in one direction causes lowering of the forward end of the trailer into a ground-supported position in which the stress in both the upper and lower connecting means is relieved.

6. In a hitch mechanism for attaching a tractor to a trailer having ground-engaging means about which the trailer is overbalanced forwardly, the combination of upper and lower connecting means each attachable respectively to tractor and trailer with the upper connecting means under compression and the lower connecting means under tension, means supporting one of said connecting means for a limited movement with reference to the other connecting means and arranged so that movement in one direction causes lowering of the forward end of the trailer into a ground-supported position in which the stress in both the upper and lower connecting means is relieved, and means for releasably latching said one connecting means against such movement under the influence of the load applied thereto as aforesaid.

7. In a hitch mechanism for attaching to a tractor a trailer having ground-engaging means about which the trailer is overbalanced forwardly, the combination of upper and lower connecting means each attachable respectively to tractor and trailer with the upper connecting means under compression and the lower connecting means under tension, stop means associated with said lower connecting means and defining two limit positions of endwise movement therefor with reference to one of its points of attachment, and means for releasably securing said lower member in the one of its limit positions in which its points of attachment to tractor and trailer have the least spacing, whereby upon release of said securing means said lower member will move automatically to its other limit position under the influence of the tension load normally applied thereto.

8. The combination of a load transferring type of hitch for connecting an unbalanced trailer to a tractor, said hitch including an element placed under stress tending to shift the same bodily when the hitch is attached to trailer and tractor, means defining two limit positions of bodily movement for said element, said stress tending to move said element from its first limit position toward the second, a latch, and an intermediate device interposed between said latch and element for enabling said latch to retain said element against movement without subjecting the latch itself to the stress imposed on said element.

9. In a hitch mechanism for connecting tractor and trailed elements, the combination of a tensionable draft linkage adapted to extend between such elements with one end attached to one of said elements, means for guidingly supporting the other end of said linkage for endwise sliding movement with reference to the other element, a toggle linkage including a pair of jointed links pivoted at their free ends respectively to the slidably guided end portion of said draft linkage and to said other element for collapsing movement of the toggle linkage as said draft linkage moves away from said other element and straightening movement of the said toggle linkage as the draft linkage moves in the opposite direction, and stop means for limiting the collapsing movement of said toggle linkage on one side of dead center while leaving it free for substantially full collapsing movement on the other side.

10. In a hitch mechanism for connecting tractor and trailed elements, the combination of a tensionable draft linkage adapted to extend between such elements with one end attached to one of said elements, means for guidingly supporting the other end of said linkage for endwise sliding movement with reference to the other element, a toggle linkage including a pair of jointed links pivoted at their free ends respectively to the slidably guided end portion of said draft linkage and to said other element for collapsing movement of the toggle linkage as said draft linkage moves away from said other element and straightening movement of the said toggle linkage as the draft linkage moves in the opposite direction, stop means for limiting the collapsing movement of said toggle linkage on one side of dead center while leaving it free for substantially full collapsing movement on the other side, and yieldable latch means for urging said toggle linkage to break over dead center toward said stop means as said toggle linkage approaches dead center during endwise movement of said draft linkage toward said other element, said latch means also being retained to yieldably retain said toggle linkage against said stop means once the toggle linkage has been collapsed against said stop means.

11. In a hitch mechanim for detachably connecting tractor and trailer elements, the combination of a tension member having means at one end for coupling the same to a first one of said elements and means at its opposite end portion for slidably guiding it with respect to the second one of said elements for endwise movement with respect thereto, a pair of jointed toggle links having their opposite free ends pivoted respectively to said member and to said second element for effecting collapsing movement of said toggle linkage as said member moves toward said second element and straightening of such linkage toward dead center as said member moves away from said second element, positive stop means for limiting the collapsing movement of said toggle on one side of dead center while leaving it free for collapsing movement on the other side, yieldable means engageable with said linkage as it approaches dead center for urging the same to break over dead center to said one side and press against said stop means, whereby an inward thrust upon said member incident to backing of the tractor in coupling on the trailer automatically shifts said toggle into partially collapsed position against said stop wherefore a subsequently applied draft load tensioning said member will tend simply to force said toggle more firmly against said stop, and manually operable means for breaking said toggle across dead center in a direction away from said stop to free said member to move forward and thereby lowering the trailer into a ground-supported position to relieve the tension in the same preparatory to uncoupling.

12. In a hitch mechanism for connecting tractor and trailer elements, the combination of a tension member having means at one end for coupling the same to a first one of said elements and means at its opposite end portion for slidably guiding it with reference to the second one of said elements for endwise movement with respect thereto, a pair of jointed toggle links having their opposite free ends pivoted respectively to said member and to said second element for effecting collapsing movement of said toggle linkage as said member moves toward said second element and straightening of such linkage toward dead center as said member moves away from said second element, positive stop means for limiting the collapsing movement of said toggle on one side of dead center while leaving it free for collapsing movement on the other side, and manually operable means for breaking said toggle across dead center in a direction away from said stop to free said slide to move forward and thereby lowering the trailer into a ground-supported position to relieve the tension in said tension member preparatory to uncoupling.

13. In a hitch mechanism for connecting a forwardly overbalanced trailer to a tractor, the combination of upper and lower connecting means each attachable respectively to tractor and trailer with the upper connecting means under compression and the lower connecting means under tension, a jointed toggle linkage connected to the end of said lower connecting means and arranged to progressively straighten into a fully expanded condition and then to break across dead center in the course of endwise movement of said lower connecting means due to the application of rearward thrust thereto, and positive stop means for limiting the collapsing movement of said toggle on one side of dead center while leaving it free for substantially full collapsing movement on the other side.

14. In a hitch mechanism for connecting a forwardly overbalanced trailer to a tractor, the combination of upper and lower connecting means each attachable respectively to tractor and trailer with the upper connecting means under compression and the lower connecting means under tension, a jointed toggle linkage connected to the end of said lower connecting means and arranged to be straightened out as the lower connecting means is thrust rearwardly upon backing of the tractor as well as to be collapsed upon forward movement of the lower connecting means with reference to the trailer, positive stop means for limiting the collapsing movement of said toggle one one side of dead center while leaving it free for substantially full collapsing movement on the other side, and means for automatically causing said toggle linkage to break across dead center toward said stop means as the toggle linkage is straightened out by a rearward thrust on said lower connecting means incident to backing of the tractor toward the trailer.

15. In a hitch mechanism for connecting a forwardly overbalanced trailer to a tractor, the combination of upper and lower connecting means each attachable respectively to tractor and trailer with the upper connecting means under compression and the lower connecting means under tension, a jointed toggle linkage operatively engaging the end of said lower connecting means and arranged to be straightened out as the lower connecting means is thrust rearwardly upon backing of the tractor as well as to be collapsed upon forward movement of the lower connecting means with reference to the trailer, positive stop means for limiting the collapsing movement of said toggle on one side of dead center while leaving it free for substantially full collapsing movement on the other side, means for yieldably urging said toggle linkage to break across dead center toward said stop means and for yieldably latching the toggle linkage against said stop means as an incident to rearward thrust on said lower connecting means caused by backing of the tractor toward the trailer, and manually operable means for breaking said toggle across dead center in a direction away from said stop means.

16. In a hitch mechanism for connecting a tractor and a forwardly overbalanced trailer, the combination of a tension link having means on its forward end for connecting it to the tractor and a slide pivoted on its trailing end, a housing guidingly receiving said slide for endwise movement of the latter and adapted to be fixed to the forward end of the trailer, a toggle linkage including first and second links pivoted together and having the free end of said first link pivoted to said slide and the free end of said second link pivoted to said housing for straightening of the linkage toward dead center as said slide moves into said housing and collapsing movement as said slide moves outward of said housing, a positive stop coacting with said toggle linkage to limit its collapsing movement on one side of dead center while leaving it free for substantially full collapsing movement on the other side, and means including a latch nose on said first toggle link and a coacting spring-biased latch keeper for urging said toggle linkage to break across dead center toward said positive stop as the toggle linkage approaches dead center incident to a rearward thrust on said tension link by the tractor.

17. In a hitch mechanism for connecting a tractor and a forwardly overbalanced trailer, the combination of a tension link having means on its forward end for connecting it to the tractor and a slide pivoted on its trailing end, a housing guidingly receiving said slide for endwise movement of the latter and adapted to be fixed to the forward end of the trailer, a toggle linkage including first and second links pivoted together and having the free end of said first link pivoted to said slide and the free end of said second link pivoted to said housing for straightening of the linkage toward dead center as said slide moves into said housing and collapsing movement as said slide moves outward of said housing, a positive stop coacting with said toggle linkage to limit its collapsing movement on one side of dead center while leaving it free for substantially full collapsing movement on the other side, means including a latch nose on said first toggle link and a coacting spring-biased keeper for not only urging said toggle linkage to break across dead center toward said positive stop as the toggle linkage approaches dead center but for also retaining said toggle linkage against said stop, and manually operable means for breaking said toggle linkage over dead center away from said positive stop.

18. The combination with a load transferring type of hitch for connecting an unbalanced trailer to a tractor, of means including an element shiftable in response to relative longitudinal movement of the tractor and trailer for effecting a slight lifting movement of the overbalanced front end of the trailer to place said hitch under stress by the load of such end, together with latching means operable automatically upon lifting of such load for retaining said shiftable means in its shifted position thereby to maintain said hitch under stress.

19. In a load transferring type of hitch mechanism for connecting a forwardly overbalanced trailer to the rear end of a tractor, the combination of a mast adapted to be fixed rigidly to the trailer in generally upright position and having a compression link hinged to its upper end to extend forward and downward, a lower linkage adapted to be pivotally connected at its forward end to the tractor, means guiding the trailing end portion of said lower linkage for endwise movement relative to the trailer, means for connecting the forward end of said compression link to the rear end of the tractor for imparting a thrust to said mast through the compression link as the tractor is backed toward the trailer to thereby lift the front end of the latter slightly, and means for releasably locking said slidably guided rear end portion of said lower link with reference to the trailer in the rearwardly thrust position which such end portion attains upon the backing of the tractor as aforesaid and with the front end of the trailer raised.

20. In a load transferring type of hitch mechanism for connecting a forwardly overbalanced trailer to the rear end of a tractor, the combination of a mast adapted to be fixed rigidly to the trailer in generally upright position and having a compression link hinged to its upper end to extend forward and downward, a lower linkage adapted to be pivotally connected at its forward end to the tractor, means guiding the trailing end portion of said lower linkage for endwise movement relative to the trailer, means for connecting the forward end of said compression link to the rear end of the tractor for imparting a thrust to said mast through the compression link as the tractor is backed toward the trailer to thereby lift the front end of the latter slightly, a toggle linkage connected to said lower end portion of said lower link andd adapted to be connected to the trailer in position to be straightened out from a collapsed position as the tractor is backed toward the trailer, and a positive stop for limiting the collapsing movement of said toggle linkage on one side of dead center while leaving the same free for substantially full collapsing movement on the other side.

21. In a load transferring type of hitch mechanism for connecting a forwardly overbalanced trailer to the rear end of a tractor, the combination of a mast adapted to be fixed rigidly to the trailer in generally upright position and having a compression link hinged to its upper end to extending forward and downward, a lower linkage adapted to be pivotally connected at its forward end to the tractor, means guiding the trailing end portion of said lower linkage for endwise movement relative to the trailer, means for connecting the forward end of said compression link to the rear end of the tractor for imparting a thrust to said mast through the compression link as the tractor is backed toward the trailer to thereby lift the front end of the latter slightly, a toggle linkage connected to the rear end portion of said lower link and adapted to be connected to the trailer in position to be straightened out from collapsed position as the tractor is backed toward the trailer, a positive stop for limiting the collapsing movement of said toggle linkage on one side of dead center while leaving the same free for substantially full collapsing movement on the other side, and means for automatically snapping said toggle over dead center toward said positive stop as the toggle linkage approaches dead center position.

22. In a weight transferring type of hitch mechanism for connecting a forwardly overbalanced trailer to a tractor, a compression link comprising, in combination, a pair of generally axially aligned members connected by mating stem and socket elements separable upon application of an endwise pull to such members, means for pivotally connecting the outer end portions of respective ones of said members to the tractor and trailer, said stem and socket members being tapered axially to afford tolerance in alignment of said members with each other during entry of said stem into said socket, and means for frictionally holding said stem releasably in a position of full entry within said socket.

23. In a weight transferring type of hitch mechanism for connecting a forwardly overbalanced trailer to a tractor, a compression link comprising, in combination, a pair of generally axially aligned members connected by mating stem and socket elements separable upon application of an endwise pull to such members, means for pivotally connecting the outer end portions of respective ones of said members to the tractor and trailer, and said stem and socket members being tapered axially to afford tolerance in alignment of said members with each other during entry of said stem into said socket.

24. In a weight transferring type of hitch mechanism for connecting a forwardly overbalanced trailer to a tractor, a compression link comprising, in combination, a pair of generally axially aligned members connected by mating stem and socket elements separable upon application of an endwise pull to such members, said stem and socket elements presenting axially tapered elements to afford tolerance in alignment of said members with each other during entry of said stem into said socket, said elements also presenting snugly fitting untapered portions mating together telescopically upon full entry of said stem into said socket to prevent lateral shift of said members with reference to each other after such entry, said elements also presenting shoulders disposed for abutment against each other upon the full entry of said stem into said socket, and means for pivotally connecting the outer end portions of respective ones of said members to the tractor and the trailer.

25. In a weight transferring type of hitch mechanism for connecting a forwardly overbalanced trailer to a tractor, a compression link comprising, in combination, a pair of generally axially aligned members having a telescoping connection therebetween adapted to transmit thrust and to pull apart upon application of tension, a third member, means for connecting said third member and one of the first-mentioned pair of members respectively to the tractor and the trailer, means connecting the other of said pair of members and said third member for endwise sliding movement relative to each other and including a pin and slot type of connection which positively limits the range of such endwise movement, the slot of such pin and slot connection being sufficiently narrow at its upper end with reference to the coacting pin for preventing lateral play and wide enough at its lower end to permit substantial lateral swing of the members which are connected by said pin and slot connection.

26. In a weight transferring type of hitch mechanism for connecting a forwardly overbalanced trailer to a tractor, a compression link comprising, in combination, a forward end member having means thereon for universally pivoting the same to the tractor, a trailing end member having means thereon for pivoting the same to the trailer to swing vertically while held against lateral movement with reference to the trailer, means including a pair of telescoping elements for detachably connecting said members to transmit thrust, and means for connecting one of said elements to its corresponding member for limited endwise movement with respect thereto and for restraining such element against lateral movement with respect to its corresponding member only when endwise thrust is applied to said members.

27. In a weight transferring type of hitch mechanism for connecting a forwardly overbalanced trailer to a tractor, the combination of a mast, means for fixing said mast rigidly to the trailer to project generally upwardly from its front end with the mast located substantially on the trailer's longitudinal center line, a compression link constituted by telescopingly joined and axially aligned elements arranged to be pulled apart endwise, means for pivoting one of said elements to the rear end of the tractor and for pivoting the other to the upper end of said mast, and means for frictionally restraining said other element against inadvertent downward swing about its pivotal connection to said mast when disconnected from said element.

28. In a forwardly overbalanced trailer and hitch for connection to a tractor, the combination of an upwardly extending mast on said trailer providing an upper hitch point, plural element connecting means attachable to the tractor, one of the elements of said connecting means including an upwardly angling linkage attached to said upper hitch point and arranged to be moved toward or away from a more vertical position by relative movement of the tractor and trailer toward or away from each other, such relative movement of the tractor and trailer being respectively effective to raise or lower the front end of the said trailer, and other of the elements of said connecting means including means for maintaining a predetermined spacing between said tractor and trailer under normal operating conditions, the space maintaining means being manually releasable to permit of the aforesaid relative movements of said tractor and trailer whereby during the operation of establishing the hitch connection between the tractor and the trailer the load of the front end of the trailer can be lifted up or transferred to the tractor by a relative approaching movement of the tractor and trailer and during a hitch disengaging operation the loaded front end of the trailer may be lowered onto a supporting means by a relative separating movement.

29. In a hitch mechanism for attaching to a tractor a forwardly overbalanced trailer, the combination of an upwardly projecting mast rigid with the trailer, a top link having means on its forward end for connecting the same to the tractor for universal pivoting movement and having means on its rear end for bringing the same to the upper end of said mast with such top link upwardly and rearwardly inclined for jackknifing of said top link and mast toward and from each other in response to relative movement of the tractor and trailer toward and away from each other, means including a lower link for interconnecting the tractor and trailer to maintain a predetermined spacing between them, and manually operable means for releasing said lower link to permit a variation in said spacing.

ERNEST V. BUNTING.

REFERENCES CITED

The following references are of record in the file of this patent:

UNITED STATES PATENTS

| Number | Name | Date |
| --- | --- | --- |
| 1,524,503 | Bennett et al. | Jan. 27, 1925 |
| 2,256,310 | Braley et al. | Sept. 16, 1941 |
| 2,360,901 | Simmons | Oct. 24, 1944 |